Oct. 6, 1953   A. A. BENSON   2,654,448
AIR-COOLED BRAKE
Filed March 20, 1948   3 Sheets-Sheet 1
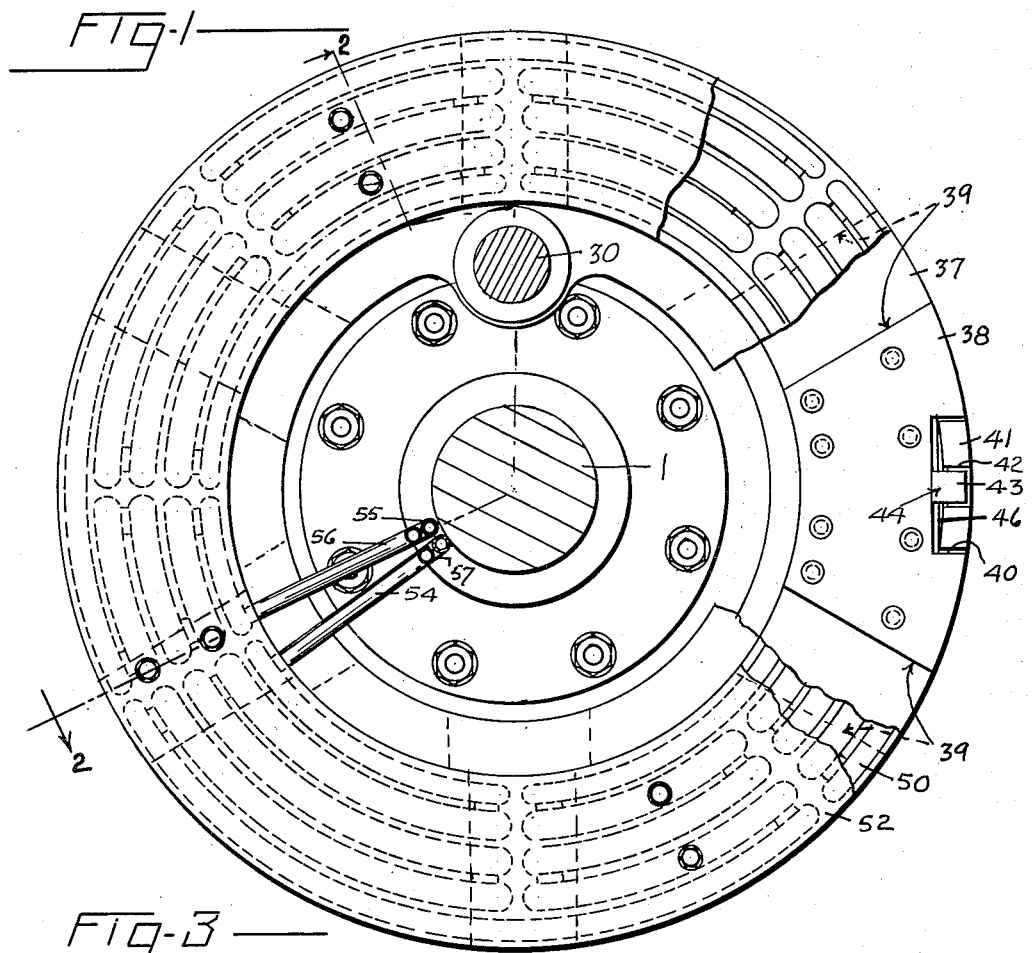
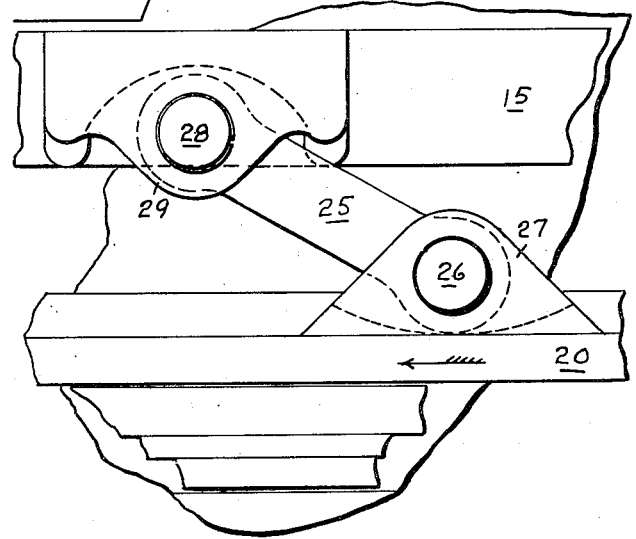
INVENTOR.
ARV A. BENSON
BY
Boyken, Mohler & Beckley
ATTORNEYS

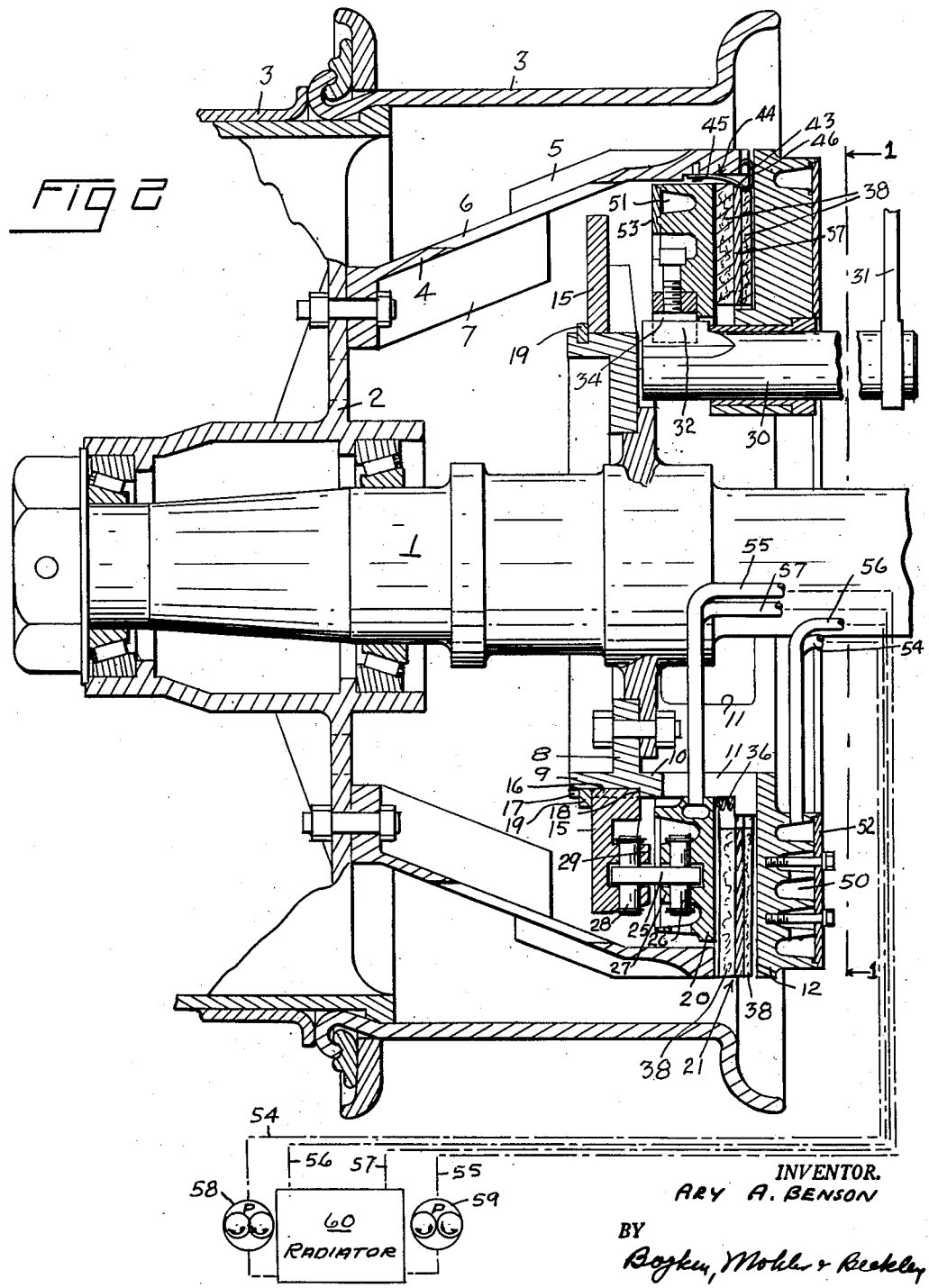

Oct. 6, 1953            A. A. BENSON            2,654,448
AIR-COOLED BRAKE
Filed March 20, 1948                                      3 Sheets-Sheet 3
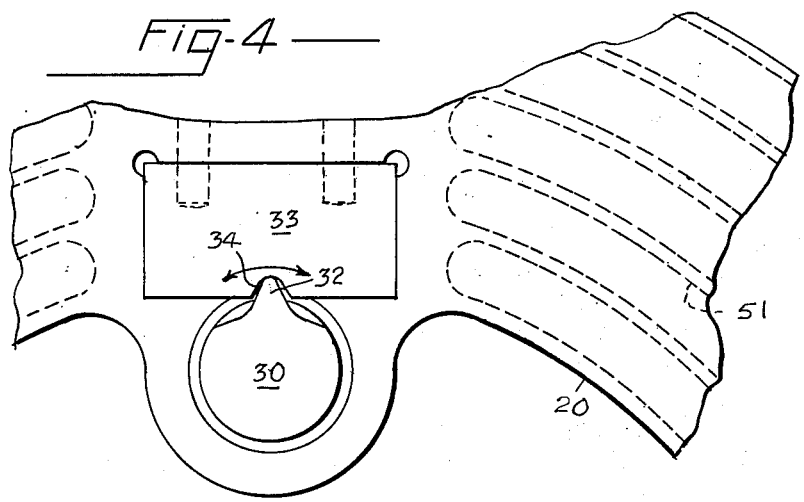
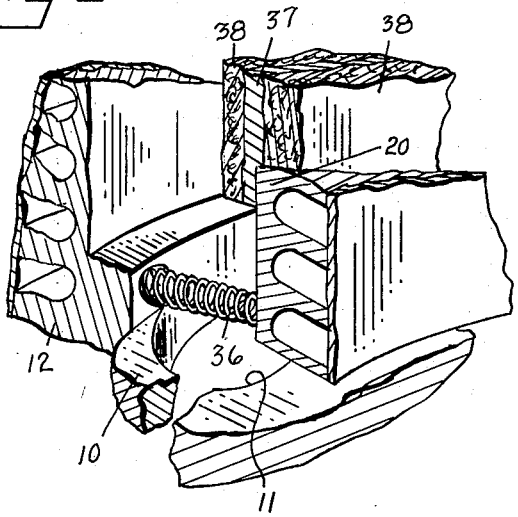
INVENTOR.
ARY A. BENSON
BY
Boykin, Mohler & Beckley
ATTORNEYS Patented Oct. 6, 1953

2,654,448

UNITED STATES PATENT OFFICE 2,654,448

AIR-COOLED BRAKE

Ary A. Benson, Oakland, Calif.

Application March 20, 1948, Serial No. 16,129

2 Claims. (Cl. 188—264)

This invention relates to brake structure and is particularly adapted for use on trailers, trucks and the like.

One of the objects of the invention is to provide a brake structure employing a radial disc type brake mechanism that is similar in some respects to the construction disclosed in my copending application for United States Letters Patent, Serial No. 687,571 for Brake Construction, filed August 1, 1946, and which present invention has simple means for cooling the brakes by fluid.

Another object of the invention is the provision of means in a radial disc type brake for insuring a circulation of air between the brake elements when the brakes are inoperative.

A still further object of the invention is the provision of relatively simple positive mechanical means for applying and releasing the brakes.

Other objects and advantages of the invention will appear more fully in the detailed description and drawings.

In the drawings,

Fig. 1 is a sectional view taken along line 1—1 of Fig. 2 with certain portions broken away to show internal structure.

Fig. 2 is a vertical sectional view taken along line 2—2 of Fig. 1.

Fig. 3 is an enlarged fragmentary elevational view of one of the connecting links between a stationary member secured to the axle and a rotatable and axially movable pressure plate.

Fig. 4 is an enlarged fragmentary elevational view of the brake actuating means.

Fig. 5 is an enlarged fragmentary perspective view, partially in section, showing portions of the two pressure plates and the friction plate between them.

In the drawings, only one brake assembly for one wheel is shown, in which the stationary axle or hub 1 has a wheel spider 2 journalled thereon, said wheel being supported for rotation on conventional bearings. The tire rims 3 are removably mounted upon the spoke ends of said spider.

Bolted to the wheel spider and coaxial with the axle 1 is the reduced diameter end of a generally frusto-conical member 4 having radially projecting fins 5 thereon for providing a blower fan action in which the air will be caused to move from within said member radially outwardly through openings 6 thereon and between said member and one of the rims 3 therearound. The fins 5 may be externally of said members and other fins 7 may be within said member adjacent openings 6.

Stationarily secured to the axle 1 is an annular member 8 coaxial with said axle which member has relatively short flange 9 projecting from the side thereof nearest the end of axle 1 adjacent thereto while a longer flange 10 projects from the side opposite flange 9. This flange 10 is formed with several openings 11 therethrough for passing air radially outwardly therethrough.

This flange 10 has a pressure plate 12 integral therewith and extending radially outwardly therefrom along its outer edges and which plate is inboard relative to the outer end of the axle.

The flanges 9, 10 are substantially continuous axially, and on these flanges is the brake assembly.

Stationarily secured to flange 9 is an annular disk 15. This disk may be formed at spaced points therearound with radially inwardly projecting lugs 16 slidable axially of central axis of the disk into keyways 17 (Fig. 2) on flange 9, and a shoulder 18 at about the juncture between flange 10 and the annular member 8 acts as a stop for limiting inward movement of the disk on the flange 9. An annular groove in said flange adjacent its outer end is adapted to receive a snap ring 19 for holding the disk on the flange and for taking any outward thrust on the disk.

Between disk 15 and the stationary pressure plate 12 is a second pressure plate 20 that will be termed a shiftable pressure plate inasmuch as it is shiftable axially. Also plate 20 has a limited rotary movement as will later be explained, the axial shifting being effected simultaneously with such rotation.

Between the shiftable pressure plate 20 and the stationary pressure plate 12 is a friction plate 21 that is rotatable with the wheel spider, being connected with said spider through engagement at its periphery with the enlarged diameter end of the frusto-conical member 4 in a manner more fully described later on. This friction plate is also shiftable axially, as will be later explained.

The shiftable pressure plate 20 is connected with the disk 15 by means of a plurality of equally spaced links 25 (Figs. 2-3), each of which is pivotally connected at one of its ends by a pivot 26 to lugs 27 formed on the pressure plate, and the opposite end of each link is pivotally connected by a pivot 28 to lugs 29 on disk 15.

The links 25 are arranged so that rotation of the pressure plate 20 in one direction will cause the plate to move axially into engagement with the friction plate 21, thus moving said plate 21 against the fixed pressure plate 12, thereby producing a braking action on the friction plate and consequently on the wheel. Upon rotation of the shiftable pressure plate in the opposite direction the same will be positively moved away from the friction plate freeing the latter for free rotation with the wheel.

Figs. 2, 4 clearly illustrate the means employed for rotating the axially shiftable pressure plate, and which means comprises a control shaft 30 journalled in a bearing in the stationary pressure plate 12. This shaft projects inwardly from the brake assembly and has a lever arm 31 (Fig. 2) secured to its projecting end, which arm may be actuated mechanically, hydraulically, or by any other suitable source of power for swinging in opposite directions to rotate the said shaft in such directions.

The opposite end of shaft 30 has an axially projecting ridge 32 (Fig. 4) that extends longitudinally thereof and that functions in the nature of a spline for connecting the shaft with block 33 having a groove 34 therein in which the said ridge is slidable. This ridge 32, in cross sectional contour, is generally in the form of a rounded nose having tapered sides, and the groove is generally of V form in cross sectional contour. Thus the rotation of the shaft 30 in either opposite direction will rotate the plate 20 in a corresponding direction.

The axes of the pivots 26, 28 are generally radially of the axis of the axle 1, although not exactly radially, inasmuch as the axes of the pivots at opposite ends of each link are substantially parallel.

Between the axially shiftable pressure plate 20 and the fixed pressure plate 12 adjacent the inner edges of said plates are expansion coil springs 36 that tend to urge the plate 20 away from the friction plate at all times, but the resistance of these springs is readily overcome upon rotation of the shiftable pressure plate for moving it toward said friction plate.

The friction plate 21 comprises a central annular metal disk 37 having equally spaced segments 38 of brake lining material, or the like, riveted to opposite sides thereof. Thus radially extending open ended channels 39 (Fig. 1) occur between adjacent pairs of segments 38 at both sides of the disk 37.

The central disk 37 is formed at spaced points around its periphery outwardly of segments 38 with square notches 40 (Fig. 1) into each of which extend axial projections 41 formed around the axially facing edges of the larger diameter end of frusto-conical member 4. This is substantially the same structure as is disclosed in my said copending application. However, in the present disclosure the outer edge of each projection 41 is notched at 42 (Figs. 1, 2) to receive the radially outwardly extending end 43 of a flat spring 44, the opposite generally horizontally extending end 45 of said spring being riveted or otherwise secured to the said member 4.

At the juncture between the end portions 43, 45 of spring 44 the said spring is adapted to slantingly extend over the peripheral edge of the disk 37 along the base 46 of notch 40, the segment 38 being cut away so the said inclined side of the spring will slidably engage the central disk. This inclination of said spring and its engagement with said disk 37 is such as to tend to yieldably move the friction disk away from the pressure plate 12 at all times. Thus when the shiftable pressure plate 20 is moved in direction away from the plate 12, the friction plate will automatically move away from the said plate. This movement is less than that of the plate 20, whereby the friction plate will be free of both pressure plates at its opposite sides when the brakes are released, permitting free flow of air over all of the friction surfaces and consequent rapid dissipation of any heat that may have developed in the plates.

In the present invention, the pressure plates 12, 20 are both cooled by circulation of a fluid, such as water, in direct heat transfer relationship to said plates. In the drawings, the plates 12, 20 are formed respectively with sinuously extending interconnected passageways 50, 51. A closure plate 52 may form one of the sides of passageways 50 and a plate 53 may form one of the sides of passageways 51, said plates being either integral with the pressure plates or removably secured thereto by suitable stud bolts, as indicated.

Inlet pipes 54, 55 may respectively communicate with one of the ends of passageways 50 and 51 and outlet pipes 56, 57 may communicate with the opposite ends thereof. Pumps 58, 59 (Fig. 2) may be interposed on the pipe lines 54, 55 for pumping water from the radiator 60 to said passageways, and pipes 56, 57 may communicate at one of their ends with said radiator 60 for returning the water from the passageways to said radiator for cooling.

Any suitable means (not shown) may connect the pumps with a source of power. In the case of vehicles, a clutch controlled power take-off from the engine is generally used and the radiator 60 may be the same radiator through which cooling water for the engine is circulated.

The system for water cooling the pressure plates in combination with the structure enabling air cooling provides for adequate cooling of brakes such as are on vehicles employed in the hilly or mountainous lumber region for transporting logs. At the present time such brakes become very hot even with the most efficient air cooling system, and replacements are numerous and costly. With the provision for water cooling in addition to air cooling, the brakes last many times longer and the safety level is greatly increased. The considerable loss in time and the costliness of the replacement of elements in the brake assemblies has heretofore acted as a deterrent in making replacements when they should have been made from a safety standpoint with the result that a considerable number of accidents have occurred due to brake failures.

In Fig. 4 it is to be noted that the shaft 30 is at an intermediate position with the ridge 32 intermediate the opposite ends of its arc of movement. The arrow indicates the full movement from one end of the arc to the other, although this movement in the direction for applying the brakes is variable according to the amount of wear on the lining. When the wear is slight, the full line position as shown may be the position when the brakes are applied.

The direction of rotation of the wheel is such that the friction plate tends to cause the brakes to be self-energizing or for the plate 20 to tend to rotate in the direction of the arrow indicated in Fig. 3.

It is to be understood that the precise details of the structure disclosed and described are not intended to necessarily restrict the invention to such details inasmuch as modifications may be made that come within the scope of the invention.

I claim:

1. In a brake construction, a fixed pressure plate, an axially shiftable pressure plate, an annular disk between said pressure plates, said plates being annular and in coaxial alignment, a central fixed hub around which said disk is rotatable, said disk being movable axially between said pressure plates, a wheel coaxial with said hub rotatable thereon, spring members carried by said wheel engageable with said disk for yieldably urging the latter away from said fixed pressure plate, means for moving said disk against the resistance of said spring members toward said fixed pressure plate, and means carried by said disk and frictionally engageable by said pressure plates for causing movement of air between said disk and said pressure plates during frictional engagement of said pressure plates with said means and when said disk is moved axially away from said fixed plate by said spring members, the radially inwardly directed edges of said plates being spaced outwardly from said fixed hub to provide an annular space for air between said hub and said plates, said hub being free from obstruction adjacent one side of said space and around said hub to permit the passage of outside air in a direction axially of said hub into said space.

2. In a brake construction, a fixed pressure plate, an axially shiftable pressure plate, an annular disk between said pressure plates, said plates being annular and in coaxial alignment, a central fixed hub around which said disk is rotatable, said disk being movable axially between said pressure plates, a wheel coaxial with said hub rotatable thereon, spring members carried by said wheel engageable with said disk for yieldably urging the latter away from said fixed pressure plate, means for moving said disk against the resistance of said spring members toward said fixed pressure plate, and means carried by said disk and frictionally engageable by said pressure plates for causing movement of air between said disk and said pressure plates during frictional engagement of said pressure plates with said means and when said disk is moved axially away from said fixed plate by said spring members, said last mentioned means being sections of brake lining secured to opposite sides of said disk in annularly spaced relationship providing radially extending open-ended channels, said disk being revolvable with said wheel about the axis of said hub, the radially inwardly directed edges of said plates being spaced outwardly from said fixed hub to provide an annular space for air between said hub and said plates, said hub being free from obstruction adjacent one side of said space and around said hub to permit the passage of outside air in a direction axially of said hub into said space.

ARY A. BENSON.

References Cited in the file of this patent

UNITED STATES PATENTS

| Number | Name | Date |
|---|---|---|
| 710,759 | Coleman et al. | Oct. 7, 1902 |
| 825,176 | Bainbridge | July 3, 1906 |
| 2,020,809 | Stock | Nov. 12, 1935 |
| 2,076,538 | Bendix | Apr. 13, 1937 |
| 2,127,557 | Ells | Aug. 23, 1938 |
| 2,165,978 | Miller | July 11, 1939 |
| 2,177,372 | Milan | Oct. 24, 1939 |
| 2,304,774 | Ash | Dec. 15, 1942 |
| 2,371,158 | Eby | Mar. 13, 1945 |